United States Patent
Kumru

(10) Patent No.: US 12,497,330 B2
(45) Date of Patent: Dec. 16, 2025

(54) USE OF REACTION RESIN MIXTURES WITH PREDEFINED POLARITY FOR SETTING THE ROBUSTNESS OF A MORTAR COMPOSITION AND METHOD FOR SETTING THE ROBUSTNESS OF A MORTAR COMPOSITION

(71) Applicant: Hilti Aktiengesellschaft, Schaan (IL)

(72) Inventor: Memet-Emin Kumru, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 722 days.

(21) Appl. No.: 17/758,598

(22) PCT Filed: Jan. 12, 2021

(86) PCT No.: PCT/EP2021/050476
§ 371 (c)(1),
(2) Date: Jul. 11, 2022

(87) PCT Pub. No.: WO2021/144259
PCT Pub. Date: Jul. 22, 2021

(65) Prior Publication Data
US 2023/0053898 A1 Feb. 23, 2023

(30) Foreign Application Priority Data
Jan. 14, 2020 (EP) .................... 20151568

(51) Int. Cl.
*C08F 220/32* (2006.01)
*C04B 26/06* (2006.01)
*C08F 220/34* (2006.01)

(52) U.S. Cl.
CPC .......... *C04B 26/06* (2013.01); *C08F 220/343* (2020.02); *C08F 2800/20* (2013.01)

(58) Field of Classification Search
CPC ......... C04B 28/06; C04B 26/06; C04B 26/16; C08F 220/343
See application file for complete search history.

(56) References Cited

U.S. PATENT DOCUMENTS

| 4,874,675 | A | 10/1989 | Ceska |
| 2012/0282059 | A1 | 11/2012 | Buder et al. |
| 2016/0053141 | A1 * | 2/2016 | Grun .................... C09J 197/002 524/13 |

FOREIGN PATENT DOCUMENTS

| DE | 10 2014 103 924 | 10/2014 |
| EP | 0 589 831 | 3/1994 |
| EP | 589831 A1 * | 3/1994 |
| EP | 3 299 432 | 3/2018 |
| JP | 2007-191536 | 8/2007 |
| JP | 2019-026789 | 2/2019 |

OTHER PUBLICATIONS

The machine translation into English of EP-589831-A1 (Year: 1994).*
International Search Report dated Apr. 13, 2021 in PCT/EP2021/050476, with English translation, 7 pages.
Written Opinion dated Apr. 13, 2021 in PCT/EP2021/050476, 8 pages.

* cited by examiner

*Primary Examiner* — Karuna P Reddy
(74) *Attorney, Agent, or Firm* — Grüneberg and Myers PLLC

(57) ABSTRACT

A non-polar reaction resin mixture can be used to improve the adhesion of a mortar composition based on radically polymerizable compounds, in particular based on urethane (meth)acrylates, on the surface of semi-cleaned and/or damp boreholes in mineral substrates. The use of a non-polar reaction resin mixture in the corresponding mortar composition reduced the sensitivity thereof to dampness and inadequate cleaning conditions, so that mortar compositions are obtained overall which are characterized by improved robustness against external influences.

6 Claims, No Drawings

USE OF REACTION RESIN MIXTURES WITH PREDEFINED POLARITY FOR SETTING THE ROBUSTNESS OF A MORTAR COMPOSITION AND METHOD FOR SETTING THE ROBUSTNESS OF A MORTAR COMPOSITION

CROSS-REFERENCE TO RELATED APPLICATIONS

This application is the National Stage entry under § 371 of International Application No. PCT/EP2021/050476, filed on Jan. 12, 2021, and which claims the benefit of priority to European Application No. 20151568.1, filed on Jan. 14, 2020. The content of each of these applications is hereby incorporated by reference in its entirety.

BACKGROUND OF THE INVENTION

Field of the Invention

The present invention relates to the use of a non-polar reaction resin mixture to improve the adhesion of a mortar composition based on radically polymerizable compounds, in particular based on urethane (meth)acrylates, on the surface of semi-cleaned and/or damp boreholes in mineral substrates. The use of a non-polar reaction resin mixture in the corresponding mortar composition reduced the sensitivity thereof to dampness and inadequate cleaning conditions, so that mortar compositions can be obtained overall which are characterized by improved robustness against external influences. The present invention also relates to a method for improving the adhesion of a mortar composition based on radically polymerizable compounds on the surface of semi-cleaned and/or damp boreholes in mineral substrates.

Description of Related Art

The use of reaction resins based on radically polymerizable compounds has been known for a long time in a wide range of fields, including construction. In the field of fastening technology, the use of reaction resins as an organic binder has prevailed. In particular, they are used as reaction resin mortar in two-component systems for anchor applications (chemical anchors), with the reaction resin mortar (component A) containing the reaction resins based on radically polymerizable compounds, and the curing agent (component B) containing the hardener. Other common constituents such as inorganic added substances or dyes can be contained in one and/or the other component. By mixing the two components, the reaction is initiated by radical formation and the organic binder is cured.

Chemical anchors are used to fasten components such as threaded anchor rods, reinforcing iron, threaded sleeves and screws in boreholes in mineral substrates such as concrete, natural stone, plaster, especially when high load values are to be achieved for the fixation. During the application, the boreholes for receiving the components to be fastened are first drilled into the mineral substrate with the appropriate dimensions. The boreholes must then be cleared of the drilling dust, after which the chemical two-component mortar composition is introduced into the borehole after the resin component is mixed with the hardener component and then the component to be fastened is inserted into the borehole filled with the mortar composition and adjusted. After curing by reaction of the resin component with the hardener component, a firm hold of the component is achieved.

The load values of the components fastened in this way and thus the load-bearing behavior thereof depend on several influencing variables that are divided into two classes in the literature as internal and external variables. The external influencing variables include the type of borehole cleaning, the quality of the mineral substrate, for example the concrete, its humidity and temperature, and the type of borehole production.

The internal influencing variables include the chemical composition of the mortar composition, the production process thereof and the packaging thereof, which usually comprises two components that are contained in separate containers such as cartridges, glass cartridges or film pouches or the like, or that are applied by means of injection systems or pouring systems.

As already described in DE102010013196 A1, a major factor influencing the load-bearing behavior of the chemical mortar composition is the quality of the borehole cleaning and the moisture of the mineral substrate. In damp boreholes and in boreholes that have been only poorly cleared of the drilling dust, there is a considerable decrease in performance, which manifests itself in reduced load values. The resistance to these influencing variables is referred to overall as the robustness of the mortar composition. According to DE102010013196 A1, at least one methacryloxyalkyltrialkoxysilane and/or a poly(meth)acryloxy alkyl silsesquioxane are added to the resin component A to improve the problem.

However, there is still a need for simple and inexpensive solutions that improve the robustness, in particular the decrease in performance in damp and semi-cleaned boreholes, of mortar compositions based on radically polymerizable compounds, in particular based on urethane (meth) acrylates.

SUMMARY OF THE INVENTION

The object of the present invention is therefore to provide a simple and inexpensive solution by means of which the robustness of a mortar composition based on radically polymerizable compounds, in particular based on urethane (meth)acrylates, can be improved. The object of the present invention is in particular to provide a solution by means of which the adhesion of a mortar composition to the surface of semi-cleaned and/or damp boreholes in mineral substrates can be improved, such that overall the sensitivity of the mortar composition to moisture and insufficient cleaning of the borehole is reduced.

It has surprisingly been found that the polarity of the reaction resin mixture contained in the mortar composition has a great influence on the robustness of the mortar composition. In particular, it has been shown that the use of non-polar reaction resin mixtures in the resin component of a mortar composition leads to improved adhesion of the mortar composition on the surface of semi-cleaned and/or damp boreholes in mineral substrates.

Without wishing to be bound by a particular theory at this point, the inventors assume that the improved adhesion is due to a reduced water absorption capacity of the mortar composition. When applying mortar compositions in damp boreholes, curing problems can often be observed at the mortar composition/mineral substrate interface. These curing problems are caused by the fact that water from the damp borehole is absorbed into the mortar composition at the interface. The curing problems are more pronounced the more water there is in the mortar composition.

The present invention therefore relates to the use of a non-polar reaction resin mixture in the resin component of a multi-component reaction resin system to improve the adhesion of a mortar composition based on radically polymerizable compounds on the surface of semi-cleaned and/or damp boreholes in mineral substrates.

The present invention also relates to a method for improving the adhesion of a mortar composition based on radically polymerizable compounds on the surface of semi-cleaned and/or damp boreholes in mineral substrates.

The present invention also relates to a resin component for a multi-component reaction resin system comprising at least one non-polar reaction resin mixture.

DETAILED DESCRIPTION OF THE INVENTION

For better understanding of the invention, the following explanations of the terminology used herein are considered to be useful. Within the meaning of the invention:

"reaction resin mixture" is a mixture consisting of at least one reaction resin and a reactive diluent;

"reaction resin based on a radically curable compound," also called "reaction resin" or "base resin" for short, is a usually solid or high-viscosity "radically curable," i.e. radically polymerizable, unsaturated compound, which cures by means of polymerization and forms a resin matrix;

"reactive diluents" are liquid or low-viscosity monomers and oligomers which contain one or more functional groups capable of reacting with the reaction resin and are predominantly constituents of the cured compound (resin matrix) during polymerization (curing);

an "inhibitor" is a compound capable of inhibiting the polymerization reaction (curing), which serves to avoid the polymerization reaction and thus an undesired premature polymerization of the reaction resin during storage (in this function often also referred to as a stabilizer) and/or to delay the start of the polymerization reaction immediately after adding the hardener; the role of the inhibitor depends on the quantities in which it is used;

"hardeners" are substances that cause or initiate the polymerization (curing) of the radically curable unsaturated compound, in particular the reaction resin;

an "accelerator" is a compound capable of accelerating the polymerization reaction (curing), which serves to accelerate the formation of radicals, in particular from the hardener;

resin component (A component) is the mixture of the reaction resin mixture with optionally at least one accelerator and/or at least one inhibitor and/or further additives;

a "hardener component" is a mixture consisting of the hardener and inorganic and/or organic added substances (fillers and/or additives), such as a phlegmatizer, i.e. stabilizer for the hardener;

a "filler" is an organic or inorganic, in particular inorganic, compound;

"mortar composition" refers to the formulation which is obtained by mixing the reaction resin mixture with the hardener component containing the hardener and which can be used as such for chemical fastening;

a "two-component reaction resin system" is a reaction resin system that comprises two components stored separately from one another, generally a resin component and a hardener component, so that the reaction resin cures only after the two components have been mixed;

a "multi-component reaction resin system" is a reaction resin system that comprises a plurality of components stored separately from one another, so that the reaction resin cures only after all components have been mixed;

"(meth)acrylic . . . / . . . (meth)acrylic . . . " means both the "methacrylic . . . / . . . methacrylic . . . " compounds and the "acrylic . . . / . . . acrylic . . . " compounds; "methacrylic . . . / . . . methacrylic . . . " compounds are preferred in the present invention;

"a" or "an" as the article preceding a class of chemical compounds, e.g, preceding the word "reactive diluent," means that one or more compounds included in this class of chemical compounds, e.g. various "reactive diluents," may be intended;

"at least one" means numerically "one or more"; in a preferred embodiment, the term means numerically "one";

"contain" and "comprise" mean that more constituents may be present in addition to the mentioned constituents; these terms are meant to be inclusive and therefore also include "consist of"; "consist of" is meant exclusively and means that no further constituents may be present; in a preferred embodiment, the terms "contain" and "comprise" mean the term "consist of."

All standards cited in this text (e.g. DIN standards) were used in the version that was current on the filing date of this application.

It has been found that the polarity of the reaction resin mixture has a significant influence on the robustness of the mortar composition. The use of non-polar reaction resin mixtures in the resin component of a multi-component reaction resin system leads to a significant improvement in the adhesion of a mortar composition based on radically polymerizable compounds, in particular based on urethane (meth)acrylates, on the surface of semi-cleaned and/or damp boreholes in mineral substrates.

The reaction resin mixture is a substantial part of the resin component (A component) and is obtained by mixing at least one reaction resin with one or more reactive diluents. The polarity of the resulting reaction resin mixture can be controlled by the selection and the amount of the reactive diluent(s) in combination with the selection of the reaction resin.

Radically polymerizable compounds that are suitable as a reaction resin are ethylenically unsaturated compounds, i.e, compounds which have carbon-carbon triple bonds, and thiol-yne/ene resins, as are known to a person skilled in the art.

Particularly preferably, the radically polymerizable compound, the reaction resin, is a compound based on urethane (meth)acrylate, epoxy (meth)acrylate, a (meth)acrylate of an alkoxylated bisphenol or a compound based on further ethylenically unsaturated compounds.

Of these compounds, the group of ethylenically unsaturated compounds is preferred, which group comprises styrene and derivatives thereof, (meth)acrylates, vinyl esters, unsaturated polyesters, vinyl ethers, allyl ethers, itaconates, dicyclopentadiene compounds and unsaturated fats, of which unsaturated polyester resins and vinyl ester resins are particularly suitable and are described, for example, in applications EP 1 935 860 A1, DE 195 31 649 A1, WO 02/051903 A1 and WO 10/108939 A1. Vinyl ester resins (synonym: (meth)acrylate resins) are in this case most preferred due to their hydrolytic resistance and excellent mechanical properties. Vinyl ester urethane resins, in particular urethane methacrylates, are very particularly preferred.

Examples of suitable unsaturated polyesters are divided into the following categories, as classified by M. Malik et al. in J. M. S.—Rev, Macromol. Chem. Phys., C40 (2 and 3), pp. 139-165 (2000):

(1) ortho-resins: these are based on phthalic anhydride, maleic anhydride or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol A;

(2) iso-resins: these are prepared from isophthalic acid, maleic anhydride or fumaric acid and glycols. These resins can contain higher proportions of reactive diluents than the ortho-resins;

(3) bisphenol A fumarates: these are based on ethoxylated bisphenol A and fumaric acid;

(4) HET acid resins (hexachloroendomethylene tetrahydrophthalic acid resins): these are resins obtained from chlorine/bromine-containing anhydrides or phenols during the preparation of unsaturated polyester resins.

In addition to these resin classes, what are referred to as dicyclopentadiene resins (DCPD resins) can also be distinguished as unsaturated polyester resins. The class of DCPD resins is either obtained by modifying one of the above-mentioned resin types by means of a Diels-Alder reaction with cyclopentadiene, or said resins are alternatively obtained by means of a first reaction of a dicarboxylic acid, for example maleic acid, with dicyclopentadienyl and then by means of a second reaction of the usual preparation of an unsaturated polyester resin, the latter being referred to as a DCPD maleate resin.

The unsaturated polyester resin preferably has a molecular weight Mn in the range of 500 to 10,000 daltons, more preferably in the range of 500 to 5,000 and even more preferably in the range of 750 to 4,000 (according to ISO 13885-1). The unsaturated polyester resin has an acid value in the range of 0 to 80 mg KOH/g resin, preferably in the range of 5 to 70 mg KOH/g resin (according to ISO 2114-2000). If a DCPD resin is used as the unsaturated polyester resin, the acid value is preferably 0 to 50 mg KOH/g resin.

In the context of the invention, vinyl ester resins are oligomers, prepolymers or polymers having at least one (meth)acrylate end group, what are referred to as (meth)acrylate-functionalized resins, which also include urethane (meth)acrylate resins and epoxy (meth)acrylates.

Vinyl ester resins, which have unsaturated groups only in the end position, are obtained, for example, by reacting epoxy oligomers or polymers (for example bisphenol A digylcidyl ether, phenol novolac-type epoxies or epoxy oligomers based on tetrabromobisphenol A) with (meth) acrylic acid or (meth)acrylamide, for example. Preferred vinyl ester resins are (meth)acrylate-functionalized resins and resins which are obtained by reacting an epoxy oligomer or polymer with methacrylic acid or methacrylamide, preferably with methacrylic acid, and optionally with a chain extender, such as diethylene glycol or dipropylene glycol. Examples of such compounds are known from applications U.S. Pat. Nos. 3,297,745 A, 3,772,404 A, 4,618,658 A, GB 2217722 A1, DE 3744390 A1 and DE 4131457 A1.

Particularly suitable and preferred vinyl ester resins are (meth)acrylate-functionalized resins, which are obtained, for example, by reacting di- and/or higher-functional isocyanates with suitable acrylic compounds, optionally with the help of hydroxy compounds that contain at least two hydroxyl groups, as described for example in DE 3940309 A1. Very particularly suitable and preferred are the urethane methacrylate resins (which are also referred to as vinyl ester urethane resins) described in DE 10 2011 017 626 B4.

Aliphatic (cyclic or linear) and/or aromatic di- or higher-functional isocyanates or prepolymers thereof can be used as isocyanates. The use of such compounds serves to increase wettability and thus to improve the adhesive properties. Aromatic di- or higher-functional isocyanates or prepolymers thereof are preferred, aromatic di- or higher-functional prepolymers being particularly preferred. Toluylene diisocyanate (TDI), diisocyanatodiphenylmethane (MDI) and polymeric diisocyanatodiphenylmethane (pMDI) for increasing chain stiffening, and hexane diisocyanate (HDI) and isophorone diisocyanate (IPDI), which improve flexibility, may be mentioned by way of example, of which polymeric diisocyanatodiphenylmethane (pMDI) is very particularly preferred.

Suitable acrylic compounds are acrylic acid and acrylic acids substituted on the hydrocarbon group, such as methacrylic acid, hydroxyl-group-containing esters of acrylic or methacrylic acid with polyhydric alcohols, pentaerythritol tri(meth)acrylate, glycerol di(meth)acrylate, such as trimethylolpropane di(meth)acrylate and neopentyl glycol mono (meth)acrylate, Acrylic or methacrylic acid hydroxyalkyl esters, such as hydroxyethyl (meth)acrylate, hydroxypropyl (meth)acrylate, polyoxyethylene (meth)acrylate, polyoxypropylene (meth)acrylate, are preferred, especially since such compounds serve to sterically prevent the saponification reaction. Because of its lower alkali stability, acrylic acid is less preferred than acrylic acids substituted on the hydrocarbon group.

Hydroxy compounds that can optionally be used are suitable dihydric or higher alcohols, for example secondary products of ethylene oxide or propylene oxide, such as ethanediol, di- or triethylene glycol, propanediol, dipropylene glycol, other diols, such as 1,4-butanediol, 1,6-hexanediol, neopentyl glycol, diethanolamine, further bisphenol A or F or their ethoxylation/propoxylation and/or hydrogenation or halogenation products, higher alcohols, such as glycerol, trimethylolpropane, hexanetriol and pentaerythritol, hydroxyl-group-containing polyethers, for example oligomers of aliphatic or aromatic oxiranes and/or higher cyclic ethers, such as ethylene oxide, propylene oxide, styrene oxide and furan, polyethers which contain aromatic structural units in the main chain, such as those of bisphenol A or F, hydroxyl-group-containing polyesters based on the above-mentioned alcohols or polyethers and dicarboxylic acids or their anhydrides, such as adipic acid, phthalic acid, tetra- or hexahydrophthalic acid, HET acid, maleic acid, fumaric acid, itaconic acid, sebacic acid and the like. Particularly preferred are hydroxy compounds having aromatic structural units to reinforce the chain of the resin, hydroxy compounds containing unsaturated structural units, such as fumaric acid, to increase the crosslinking density, branched or star-shaped hydroxy compounds, in particular trihydric or higher alcohols and/or polyethers or polyesters containing the structural units thereof, branched or star-shaped urethane (meth)acrylates to achieve lower viscosity of the resins or their solutions in reactive diluents and higher reactivity and crosslinking density.

The vinyl ester resin preferably has a molecular weight Mn in the range of 500 to 3,000 daltons, more preferably 500 to 1,500 daltons (according to ISO 13885-1), The vinyl ester resin has an acid value in the range of 0 to 50 mg KOH/g resin, preferably in the range of 0 to 30 mg KOH/g resin (according to ISO 2114-2000).

All of these reaction resins that can be used according to the invention as radically polymerizable compounds can be modified according to methods known to a person skilled in the art, for example to achieve lower acid numbers, hydroxide numbers or anhydride numbers, or can be made more flexible by introducing flexible units into the backbone, and the like.

In addition, the reaction resin may contain other reactive groups that can be polymerized with a radical initiator, such as peroxides, for example reactive groups derived from itaconic acid, citraconic acid and allylic groups and the like.

In order to produce the non-polar reaction resin mixture, the reaction resin is mixed with at least one further low-viscosity, radically polymerizable, ethylenically unsaturated compound as the reactive diluent. It is possible that it is sufficient to use only one reactive diluent, which then, in combination with the reaction resin, results in the non-polar reaction resin mixture.

Usually, however, a mixture of at least two reactive diluents is used. The selection of the reactive diluent or a mixture of two or more reactive diluents is made depending on the polarity of the reaction resin, so that a non-polar reaction resin mixture can be adjusted by matching one or more reactive diluents to the reaction resin. Primarily, the desired properties of the chemical anchor, which is made from the mortar composition comprising the reaction resin mixture, determine the initial selection of the reaction resin. The present invention thus makes it possible to improve the overall robustness of the mortar composition even with a limited variability of the reaction resin.

In the context of the present invention, the expression "non-polar reaction resin mixture" means a reaction resin mixture in which the polar component of the surface tension of the reaction resin mixture is <7 mN/m, in particular 0 mN/m to 7 mN/m. A reactive diluent or the mixture of different reactive diluents is referred to as non-polar if the polar proportion of the surface tension of the reaction resin mixture is <7 mN/m, in particular 0 mN/m to 7 mN/m.

The surface tension of a compound or a mixture of compounds is made up of a dispersive and a polar proportion. In the context of the present invention, the polar proportion of the surface tension is a measure of the polarity of the reaction resin mixture and applies for the classification of the reactive diluents, which proportion is determined by means of contact angle measurement (drop contour analysis system G10/DSA10 from KRÜSS) on a non-polar reference surface (Teflon). The contact angle measurement is usually carried out at 25° C. The following criteria must be met during the measurement: a) the surface tension of the solid is known and completely non-polar (Teflon (20 mN/m and polar proportion=0)); b) the total surface tension of the reaction resin mixture is known.

This is determined by means of the pendant drop method (drop contour analysis system G10/DSA10 from KRÜSS); c) the progressing contact angle between the reaction resin mixture and the reference surface is determined (drop contour analysis system G10/DSA10 from KRÜSS).

The selection of the reactive diluent or the selection of the mixture of two or more reactive diluents is made by a person skilled in the art depending on the reaction resin and the desired properties of the mortar composition or the chemical anchor resulting from the mortar composition.

In principle, all low-viscosity, radically polymerizable, ethylenically unsaturated compounds, in particular those which are described in applications EP 1935860 A1 and DE 19531649 A1, can be used as reactive diluents for producing the reaction resin mixture. When selecting the reactive diluent, it is only necessary to ensure that a non-polar reaction resin mixture is produced from the combination of the reaction resin with the reactive diluent(s). Under certain circumstances, it may also be possible to use a mixture of a polar and a non-polar reactive diluent in order to achieve an optimal setting of the non-polar reaction resin mixture.

The reaction resin mixture preferably contains a (meth) acrylic acid ester as a reactive diluent, with (meth)acrylic acid esters being particularly preferably selected from the group consisting of hydroxypropyl (meth)acrylate, propanediol-1,3-di(meth)acrylate, butanediol-1,2-di(meth)acrylate, trimethylolpropane tri(meth)acrylate, 2-ethylhexyl (meth) acrylate, phenylethyl (meth)acrylate, tetrahydrofurfuryl (meth)acrylate, ethyl triglycol (meth)acrylate, N,N-dimethylaminoethyl (meth)acrylate, N,N-dimethylaminomethyl (meth)acrylate, butanediol-1,4-di(meth)acrylate, butanediol-1,3-di(meth)acrylate, hexanediol-1,6-di(meth)acrylate, acetoacetoxyethyl (meth)acrylate, ethanediol-1,2-di(meth) acrylate, isobornyl (meth)acrylate, di-, tri- or oligoethylene glycol di(meth)acrylate, methoxypolyethylene glycol mono (meth)acrylate, trimethylcyclohexyl(meth)acrylate, 2-hydroxyethyl(meth)acrylate, dicyclopentenyloxyethyl (meth) acrylate and/or tricyclopentadienyl di(meth)acrylate, bisphenol A (meth)acrylate, novolac epoxy di(meth)acrylate, di[(meth)acryloyl-maleoyl]tricyclo-5.2.1.0.$^{2,6}$-decane, dicyclopentenyloxyethyl crotonate, 3-(meth)acryloyloxymethyltricylo-5.2.1.0.$^{2,6}$-decane, 3-(meth)cyclopentadienyl (meth)acrylate, isobornyl (meth)acrylate and decalyi-2-(meth)acrylate. Biogenic reactive diluents such as tetrahydrofurfuryl (meth)acrylate, isobornyl (meth)acrylate or isosorbide di(meth)acrylate are preferred.

To produce the non-polar reaction resin mixture or to lower the polarity of a reaction resin mixture, reactive diluents are preferably used which have little or no permanent dipole moment. Corresponding reactive diluents preferably have a long alkyl chain without functional groups. The long alkyl chain is preferably a branched, unbranched or cyclic alkyl radical having 3 to 20 carbon atoms.

The reactive diluents for producing a non-polar reaction resin mixture are preferably selected from the group consisting of ethyl methacrylate (EMA), 3,3,5-trimethylcyclohexyl methacrylate (TMCHMA), isobornyl methacrylate (IBOMA), isobutyl methacrylate (i-BMA), tetrahydrofurfuryl methacrylate (THFMA), 2-ethylhexyl methacrylate (2-HEMA), cyclohexyl methacrylate (c-HMA), allyl methacrylate (AMA), benzyl methacrylate (BNMA), isodecyl methacrylate (IDMA), 1,12-dodecanediol dimethacrylate (1,12-DDDDMA), 1,6-hexanediol dimethacrylate (1,6-HDDMA), 1,4-butanediol dimethacrylate (1,4-BDDMA), 1,3-butanediol dimethacrylate (1,3-BDDMA), ethylene glycol dimethacrylate (EGDMA) and glycerol dimethacrylate.

The reactive diluents can be used either individually or as a mixture of two or more reactive diluents. For optimal setting of the properties of the non-polar reaction resin mixture, the mortar composition and the chemical anchor, a mixture of polar and non-polar reactive diluents is preferably used.

The reaction resin mixture can contain the reactive diluent in an amount of 90 to 10 wt. %, preferably 80 to 20 wt. %, particularly preferably 70 to 30 wt. %, based on the resin component (A).

Expediently, the resin component also contains at least one accelerator. This accelerates the curing reaction of the reaction resin mixture with the hardener. Suitable accelerators are known to a person skilled in the art. These are expediently amines.

Suitable amines are selected from the following compounds, which are described in application US 2011071234 A1, for example: dimethylamine, trimethylamine, ethylarnine, diethylamine, triethylamine, n-propylamine, di-n-propylamine, tri-n-propylamine, iso-propylamine, di-iso-propylamine, tri-iso-propylamine, n-butylamine, iso-butylamine, tert-butylamine, di-n-butylamine, di-iso-butylamine, tri-iso-butylamine, pentylarnine, iso-pentylamine, di-iso-pentylamine, hexylamine, octylarnine, dodecylamine, laurylamine, stearylamine, aminoethanol, diethanolamine, triethanolamine, aminohexanol, ethoxyaminoethane, dimethyl(2-chloroethyDamine, 2-ethylhexylamine, bis(2-chloroethyl)amine, 2-ethylhexylamine, bis(2-ethylhexyl)amine, N-methylstearylamine, dialkylamines, ethylenediamine, N,N'-dimethylethylenediamine, tetramethylethylenediamine, diethylenetriamine, permethyldiethylenetriarnine, triethylenetetramine, tetraethylenepentamine, 1,2-diaminopropane, di-propylenetriamine, tripropylenetetramine, 1,4-diaminobutane, 1,6-diaminohexane, 4-amino-1-diethylaminopentane, 2,5-diamino-2,5-dimethylhexane, trimethylhexamethylenediamine, N,N-dimethylaminoethanol, 2-(2-diethylaminoethoxy)ethanol, bis(2-hydroxyethyl)oleylamine, tris[2(2-hydroxyethoxy)ethyl]amine, 3-amino-1-propanol, methyl(3-aminopropyl)ether, ethyl-(3-aminopropyl)ether, 1,4-butanediol-bis(3-aminopropyl)ether, 3-dimethylamino-1-propanol, 1-amino-2-propanol, 1-diethylamino-2-propanol, di-iso-propanolamine, methyl-bis(2-hydroxypropyl)amine, tris(2-hydroxypropyl) amine, 4-amino-2-butanol, 2-amino-2-methylpropanol, 2-amino-2-methylpropanediol, 2-amino-2-hydroxymethylpropanediol, 5-diethylamino-2-pentanone, 3-methylaminopropionitrile, 6-aminohexanoic acid, 11-aminoundecanoic acid, 6-aminohexanoic acid ethyl ester, 11-aminohexanoate-isopropyl ester, cyclohexylamine, N-methylcyclohexylamine, N,N-dimethylcyclohexylamine, dicyclohexylamine, N-ethylcyclohexylamine, N-(2-hydroxyethyl)cyclohexylamine, N,N-bis(2-hydroxyethyl)cyclohexylamine, N-(3-aminopropyl)cyclohexylamine, aminomethylcyclohexane, hexahydrotoluidine, hexahydrobenzylamine, aniline, N-rnethylaniline, N,N-dimethylaniline, N,N-diethylaniline, N,N-di-propylaniline, iso-butylaniline, toluidine, diphenylamine, hydroxyethylaniline, bis(hydroxyethyl)aniline, chloroaniline, aminophenols, aminobenzoic acids and esters thereof, benzylamine, dibenzylamine, tribenzylamine, methyldibenzylamine, α-phenylethylamine, xylidine, di-iso-propylaniline, dodecylaniline, aminonaphthalene, N-methylaminonaphthalene, N,N-dimethylaminonaphthalene, N,N-dibenzylnaphthalene, diaminocyclohexane, 4,4'-diaminodicyclohexylmethane, diamino-dimethyldicyclohexylrnethane, phenylenediamine, xylyienediamine, diaminobiphenyl, naphthalenediamines, benzidines, 2,2-bis (aminophenyl)propane, aminoanisoles, aminothiophenols, aminodiphenyl ethers, aminocresols, morpholine, N-methylmorpholine, N-phenylmorpholine, hydroxyethylmorpholine, N-methylpyrrolidine, pyrrolidine, piperidine, hydroxyethylpiperidine, pyrroles, pyridines, quinolines, indoles, indolenines, carbazoles, pyrazoles, imidazoles, thiazoles, pyrimidines, quinoxalines, aminomorpholine, dimorpholineethane, [2,2,2]-diazabicyclooctane and N,N-dimethyl-p-toluidine.

Preferred amines are symmetrically or asymmetrically substituted aniline and toluidine derivatives and N,N-bis (hydroxy)alkylarylamines, such as N,N-dimethylaniline, N,N-diethylaniline, N,N-dimethyl-p-toluidine, N,N-bis(hydroxyalkyl)arylamines, N,N-bis(2-hydroxyethyl)aniline, N,N-bis(2-hydroxyethyl)toluidine, N,N-bis(2-hydroxypropyl)aniline, N,N-bis(2-hydroxypropyl)toluidine, N,N-bis(3-methacryloyl-2-hydroxypropyl)-p-toluidine, N,N-dibutoxyhydroxypropyl-p-toluidine, N-methyl-N-hydroxyethyl-p-toluidine, N-ethyl-N-hydroxyethyl-p-toluidine and the analog o- or m-toluidines and 4,4'-bis(dimethylamino)diphenylmethane and/or the leuco forms of the dyes crystal violet or malachite green.

Polymeric amines, such as those obtained by polycondensation of N,N-bis(hydroxyalkyl)aniline with dicarboxylic acids or by polyaddition of ethylene oxide and these amines, are also suitable as accelerators.

The reaction resin system can contain the accelerator in an amount 0.01 to 10 wt. %, preferably 0.5 to 5 wt. %, particularly preferably 0.5 to 3 wt. %, based on the resin component.

In another embodiment, the resin component also contains an inhibitor for the storage stability of the resin component. The resin component can contain the inhibitor alone or together with the accelerator.

The inhibitors which are conventionally used for radically polymerizable compounds, as are known to a person skilled in the art, are suitable as inhibitors. The inhibitors are preferably selected from phenolic compounds and non-phenolic compounds, such as stable radicals and/or phenothiazines.

Suitable phenolic inhibitors are phenols, such as 2-methoxyphenol, 4-methoxyphenol, 2,6-di-tert-butyl-4-methylphenol, 2,4-di-tert-butylphenol, 2,6-di-tert-butylphenol, 2,4,6-trimethylphenol, 2,4,6-tris(dimethylaminomethyl)phenol, 4,4'-thio-bis(3-methyl-6-tert-butylphenol), 4,4'-isopropylidenediphenol, 6,6'-di-tert-butyl-4,4'-bis(2,6-di-tert-butylphenol), 1,3,5-trimethyl-2,4,6-tris(3,5-di-tert-butyl-4-hydroxybenzyl)benzene, 2,2'-methylene-di-p-cresol, pyrocatechol and butylpyrocatechols such as 4-tert-butylpyrocatechol, 4,6-di-tert-butylpyrocatechol, hydroquinones such as hydroquinone, 2-methylhydroquinone, 2-tert-butylhydroquinone, 2,5-di-tert-butylhydroquinone, 2,6-di-tert-butylhydroquinone, 2,6-dimethylhydroquinone, 2,3,5-trimethylhydroquinone, benzoquinone, 2,3,5,6-tetrachloro-1,4-benzoquinone, methylbenzoguinone, 2,6-dimethylbenzoquinone, naphthoquinone, or mixtures of two or more thereof.

Phenothiazines, such as phenothiazine and/or derivatives or combinations thereof, or stable organic radicals, such as galvinoxyl radicals and N-oxyl radicals, are preferably taken into consideration as non-phenolic or anaerobic inhibitors, i.e. inhibitors that are active even without oxygen, in contrast with the phenolic inhibitors.

Examples of N-oxyl radicals that can be used are those described in DE 199 56 509. Suitable stable N-oxyl radicals (nitroxyl radicals) can be selected from 1-oxyl-2,2,6,6-tetramethylpiperidine, 1-oxyl-2,2,6,6-tetramethylpiperidin-4-ol (also referred to as TEMPOL), 1-oxyl-2,2,6,6-tetramethylpiperidin-4-one (also referred to as TEMPON), 1-oxyl-2,2,6,6-tetramethyl-4-carboxy-piperidine (also known as 4-carboxy-TEMPO), 1-oxyl-2,2,5,5-tetramethylpyrrolidine, 1-oxyl-2,2,5,5-tetramethyl-3-carboxylpyrrolidine (also referred to as 3-carboxy-PROXYL), aluminum-N-nitrosophenylhydroxylamine and diethylhydroxylamine. Further suitable N-oxyl compounds are oximes, such as acetaldoxime, acetone oxime, methyl ethyl ketoxime, salicyloxime, benzoxime, glyoximes, dimethylglyoxime, acetone-O-(benzyloxycarbonyl)oxime and the like.

These compounds are particularly useful and mostly necessary because otherwise the desired storage stability of preferably more than 3 months, in particular 6 months or more, cannot be achieved. The UV stability and in particular the storage stability can be increased considerably in this way.

Furthermore, pyrimidinol or pyridinol compounds substituted in para-position to the hydroxyl group, as described in patent DE 10 2011 077 248 B1, can be used as inhibitors.

Preferred inhibitors are 1-oxyl-2,2,6,6-tetramethylpiperidine (TEMPO) and 1-oxyl-2,2,6,6-tetramethylpiperidin-4-ol (TEMPOL), catechols, particularly preferably tert-butyl-pyrocatechol and pyrocatechol, BHT and phenothiazine.

The inhibitors can be used either alone or as a combination of two or more thereof, depending on the desired properties of the reaction resin system.

The reaction resin system can contain the inhibitor in an amount of 0.001 to 5 wt. %, preferably 0.01 to 3 wt. %, particularly preferably 0.05 to 1 wt. %, based on the resin component. If a plurality of inhibitors are contained, the amount just mentioned corresponds to the total amount of inhibitors.

According to one embodiment, the resin component contains inorganic added substances, such as fillers and/or other additives.

The fillers used are conventional fillers, preferably mineral or mineral-like fillers, such as quartz, glass, sand, quartz sand, quartz powder, porcelain, corundum, ceramics, talc, silica (e.g. fumed silica), silicates, clay, titanium dioxide, chalk, barite, feldspar, basalt, aluminum hydroxide, granite or sandstone, polymeric fillers such as thermosets, hydraulically curable fillers such as gypsum, quicklime or cement (e.g. alumina cement or Portland cement), metals such as aluminum, carbon black, and also wood, mineral or organic fibers, or the like, or mixtures of two or more thereof, which can be added as powder, in the form of granules or in the form of shaped bodies. The fillers may be present in any desired forms, for example as powder or flour, or as shaped bodies, for example in cylindrical, annular, spherical, platelet, rod, saddle or crystal form, or else in fibrous form (fibrillar fillers), and the corresponding particles preferably have a maximum diameter of 10 mm. However, the globular, inert substances (spherical form) have a preferred and more pronounced reinforcing effect.

Fillers are present in the resin component preferably in an amount of 20 to 90, in particular 40 to 80, more particularly 50 to 80 wt. %.

Further conceivable additives are also rheological additives, such as optionally organically after-treated fumed silica, bentonites, alkyl- and methylcelluloses, castor oil derivatives or the like, plasticizers, such as phthalic or sebacic acid esters, stabilizers, antistatic agents, thickeners, flexibulizers, curing catalysts, rheology aids, wetting agents, coloring additives, such as dyes or in particular pigments, for example for different staining of the components for improved control of the mixing thereof, or the like, or mixtures of two or more thereof. Agents for regulating pH, such as inorganic and/or organic acids according to DE102010008971A1, in particular copolymers having acidic groups, for example esters of phosphoric acid, can also be used. Non-reactive diluents (solvents) such as low-alkyl ketones, e.g. acetone, di-low-alkyl low-alkanoyl amides such as dimethylacetamide, low-alkylbenzenes such as xylenes or toluene, phthalic acid esters or paraffins, or water can also be present, preferably in an amount of up to 30 wt. %, based on the particular component (reaction resin mortar, curing agent), for example from 1 to 20 wt. %. Furthermore, agents for improving the compatibility between the resin component and the hardener component can also be used, such as ionic, nonionic or amphoteric surfactants; soaps, wetting agents, detergents; polyalkylene glycol ethers; salts of fatty acids, mono- or diglycerides of fatty acids, sugar glycerides, lecithin; alkanesulfonates, alkylbenzenesulfonates, fatty alcohol sulfates, fatty alcohol polyglycol ethers, fatty alcohol ether sulfates, sulfonated fatty acid methyl esters; fatty alcohol carboxylates; alkyl polyglycosides, sorbitan esters, N-methyl glucamides, sucrose esters; alkyl phenols, alkyl phenol polyglycol ethers, alkyl phenol carboxylates; quaternary ammonium compounds, esterquats, carboxylates of quaternary ammonium compounds.

The curing of the resin component is expediently initiated using a peroxide as a hardener. In addition to the peroxide, an accelerator can also be used. Any of the peroxides known to a person skilled in the art that are used to cure methacrylate resins can be used. Such peroxides include organic and inorganic peroxides, either liquid or solid, and it is also possible to use hydrogen peroxide. Examples of suitable peroxides are peroxycarbonates (of formula —OC(O)OO—), peroxyesters (of formula —C(O)OO—), diacyl peroxides (of formula —C(O)OOC(O)—), dialkyl peroxides (of formula —OO—) and the like. These may be present as oligomers or polymers. A comprehensive range of examples of suitable peroxides is described, for example, in application US 2002/0091214 A1 paragraph [0018].

The peroxides are preferably selected from the group of organic peroxides. Suitable organic peroxides are: tertiary alkyl hydroperoxides such as tert-butyl hydroperoxide and other hydroperoxides such as cumene hydroperoxide, peroxyesters or peracids such as tert-butyl peresters (e.g. tert-butyl peroxybenzoate), benzoyl peroxide, peracetates and perbenzoates, lauroyl peroxide including (di)peroxyesters, perethers such as peroxy diethyl ether, perketones such as methyl ethyl ketone peroxide. The organic peroxides used as curing agents are often tertiary peresters or tertiary hydroperoxides, i.e. peroxide compounds having tertiary carbon atoms which are bonded directly to an —O—O-acyl or —OOH group. However, mixtures of these peroxides with other peroxides can also be used. The peroxides may also be mixed peroxides, i.e. peroxides which have two different peroxide-carrying units in one molecule. Preferably, benzoyl peroxide (BPO) or tert-butyl peroxybenzoate is used for curing.

In particular, persulfates, perborates and/or perphosphates, such as ammonium persulfate, potassium and sodium monopersulfates or potassium and sodium dipersulfates, can be used as inorganic peroxides. However, hydrogen peroxide can also be used.

The use of organically substituted ammonium persulfates (for example N'N'N'N'-tetrabutylammonium or N'N'N'-tricapryl-N'-methylammonium persulfate is also possible.

According to the invention, in addition to the peroxide, the hardener component also contains a phlegmatizer for stabilizing the peroxide. Corresponding phlegmatizers are known from DE 3226602 A1, EP 0432087 A1 and EP 1 371 671 A1.

The hardener component preferably contains water as a phlegmatizer. In addition to the water, the hardener component can also contain further phlegmatizers, with water being preferred as the sole phlegmatizer in order not to introduce any compounds which have a softening effect.

The reaction resin system can contain the peroxide in an amount of 0.25 to 35 wt. %, preferably 1 to 30 wt. %, particularly preferably 5 to 25 wt. %, based on the hardener composition.

The hardener component preferably also contains inorganic added substances, such as fillers and/or other additives, as can be added to the resin component.

The use according to the invention of a non-polar reaction resin mixture preferably occurs in multi-component reaction resin systems, in particular two-component reaction resin systems, in which the resin component and the hardener component are separate in different containers to inhibit the reaction, for example a multi-chamber device such as a multi-chamber cartridge, from which containers the two components are ejected and mixed by the application of mechanical pressing forces or by the application of gas pressure. Another possibility is to produce the two-component reaction resin system as two-component capsules which are introduced into the borehole and are destroyed by placement of the fixing element in a rotational manner, with simultaneously mixing of the two components of the mortar composition. A cartridge system or an injection system is preferably used in which the two components are ejected out of the separate containers and passed through a static mixer in which they are homogeneously mixed and then discharged through a nozzle preferably directly into the borehole.

The two-component reaction resin system is used primarily in the construction sector, for example for the repair of concrete, as polymer concrete, as a coating composition based on synthetic resin or as a cold-curing road marking. Said system is particularly suitable for chemically fastening anchoring elements, such as anchors, reinforcing bars, screws and the like, in boreholes, in particular in boreholes in various substrates, in particular mineral substrates, such as those based on concrete, aerated concrete, brickwork, limestone, sandstone, natural stone and the like.

The present invention also relates to a method for improving the adhesion of a mortar composition based on radically polymerizable compounds on the surface of semi-cleaned and/or damp boreholes in mineral substrates. The method according to the invention comprises the following steps: i) providing a reaction resin, ii) mixing the reaction resin with one or more reactive diluents to produce a non-polar reaction resin mixture and iii) using the non-polar reaction resin mixture thus produced in a resin component of a multi-component reaction resin system. The above statements apply to the reaction resin, the reactive diluent and the reaction resin mixture.

The present invention also relates to a resin component based on radically polymerizable compounds for a multi-component reaction resin system, in particular a two-component reaction resin system, comprising a non-polar reaction resin mixture containing at least one reaction resin and one or more reactive diluents for the chemical fastening of construction elements.

The following examples serve to explain the invention in greater detail.

EXAMPLES

The resin components non-polar 1 to 5 (according to the invention) and polar 1 to 4 (not according to the invention) were produced by mixing the constituents given in Tables 1 and 2.

TABLE 1

Constituents of the resin components non-polar 1 to non-polar 5 [in wt. %]

| | Constituent | Non-polar 1 | Non-polar 2 | Non-polar 3 | Non-polar 4 | Non-polar 5 |
|---|---|---|---|---|---|---|
| Reaction resin | Urethane methacrylate oligomer (difunctional) | 32.64 | 32.66 | 32.67 | 32.65 | 32.68 |
| Reactive diluent | Butanediol-1,4-dimethacrylate (BDDMA) | 9.05 | 32.67 | 32.68 | 32.66 | 32.69 |
| | Hydroxypropyl methacrylate (HPMA) | 1.23 | 1.23 | 1.23 | 1.23 | 1.23 |
| | 3,3,5-trimethylcyclohexyl methacrylate (TMCHMA) | 31.42 | — | — | — | — |
| | Tricyclodecanediol dimethacrylate (TCDDMA) | 23.60 | — | — | — | — |
| | Allyl methacrylate (AMA) | — | 31.44 | — | — | — |
| | Isobutyl methacrylate (i-BMA) | — | — | 31.44 | — | — |
| | Cyclohexyl methacrylate (c-HMA) | — | — | — | 31.43 | — |
| | Ethyl methacrylate | — | — | — | — | 31.45 |
| | Para-toluidine accelerator | 1.70 | 1.70 | 1.70 | 1.70 | 1.70 |
| | TEMPOL inhibitor | 0.35 | 0.30 | 0.28 | 0.32 | 0.25 |

TABLE 2

Constituents of the resin components polar 1 to 4 [in wt. %]

| | Constituent | Polar 1 | Polar 2 | Polar 3 | Polar 4 |
|---|---|---|---|---|---|
| Reaction resin | Urethane methacrylate oligomer (difunctional) | 32.59 | 32.60 | 32.59 | 32.61 |
| Reactive diluent | Butanediol-1,4-dimethacrylate (BDDMA) | — | — | 16.30 | 9.04 |
| | Hydroxypropyl methacrylate (HPMA) | 32.60 | 32.61 | 1.23 | 1.23 |
| | Tetraethoxylated bisphenol A dimethacrylate (E4BADMA) | 32.60 | — | — | — |
| | Ethylene glycol dimethacrylate (EGDMA) | — | 32.61 | — | 23.58 |
| | Glycerine dimethacrylate (GDMA) | — | — | 16.30 | — |
| | Glycerine monomethacrylate (GMMA) | — | — | 31.37 | 31.39 |
| | Para-toluidine accelerator | 1.70 | 1.70 | 1.70 | 1.70 |
| | TEMPOL inhibitor | 0.50 | 0.47 | 0.52 | 0.45 |

Determination of Resin Polarity

As a measure of the polarity of the relevant reaction resin mixture, the polar proportion of the surface tension was taken, which was determined by means of contact angle measurement (drop contour analysis system G10/DSA10 from KRÜSS) on a non-polar reference surface (Teflon). The results of the polarity measurement are shown in Table 3.

Production of Two-Component Reaction Resin Systems

The production of two-component reaction resin systems using the reaction resin mixtures listed in Tables 1 and 2 was carried out according to the following procedure: 39.3 g of the resin component, 37.2 g quartz sand F32 (Quarzwerke) and 18.51 g Secar80 (aluminate cement), 0.4 g boric acid (SCL Italia) and 3 g hydrophobic silica (Cabot GmbH) were homogenized in the dissolver under vacuum to form a paste-like compound free of air bubbles.

The hardener component of the commercially available product HY150 Max from Hilti was used as the hardener component B. The resin components A were each used in a volume ratio of A:B=3:1. The compositions were mixed with one another by a static mixer by means of the Hilti BD 2000 dispenser and applied into a borehole.

Determination of Load Values

To determine the load values of the cured compositions, an anchor threaded rod M12 is used, which is dowelled into a borehole in concrete having a diameter of 14 mm and a borehole depth of 110 mm with the two-component reaction resin according to the invention. The average failure load is determined by centrally pulling out the threaded anchor rod with close support using high-strength threaded anchor rods. 5 anchor threaded rods are dowelled in each case and the load values thereof are determined after curing for 24 hours at room temperature (25° C.). The load values were determined on the one hand under reference conditions (dry, cleaned borehole (blowing out with compressed air, brushing with a wire brush (3×), blowing out with compressed air)) and on the other hand in a damp and semi-cleaned borehole (F1b) (blowing out with compressed air, brushing with a wire brush (1×), blowing out with compressed air)). The load values determined in this way are listed in Table 3 below as an average.

TABLE 1

Results of the measurement of the polarity of the reaction resin mixture and determination of the load values under reference conditions and under F1b conditions

| Resin component with reaction resin mixture | Polarity [mN/m] | Shrinkage [%] | Bond stress [N/mm²] | | Difference [%] |
| --- | --- | --- | --- | --- | --- |
| | | | Reference | F1b | |
| Non-polar 1 | 0.4 | 1.3 | 17.5 ± 1.0 | 16.4 ± 0.8 | −6.1 |
| Non-polar 2 | 4.8 | 3.6 | 10.7 ± 0.4 | 12.6 ± 0.4 | 17.8 |
| Non-polar 3 | 6.0 | 3.3 | 13.9 ± 0.6 | 13.2 ± 0.7 | −4.9 |
| Non-polar 4 | 6.7 | 2.9 | 16.3 ± 0.5 | 14.9 ± 0.6 | −8.7 |
| Non-polar 5 | 6.9 | 3.1 | 12.4 ± 0.8 | 11.6 ± 0.9 | −6.2 |
| Polar 1 | 8.7 | 1.9 | 19.9 ± 0.8 | 17.5 ± 0.7 | −12.2 |
| Polar 2 | 9.8 | 1.5 | 18.9 ± 0.3 | 13.3 ± 0.7 | −29.5 |
| Polar 3 | 10.1 | 2.0 | 18.2 ± 0.4 | 14.7 ± 0.5 | −19.6 |
| Polar 4 | 13.3 | 2.4 | 16.9 ± 0.7 | 13.7 ± 0.6 | −19.2 |

The results in Table 3 show the influence of the polarity of the reaction resin mixture on the robustness of a two-component reaction resin system. The use of a non-polar reaction resin mixture in the corresponding mortar composition reduced the sensitivity thereof to dampness and inadequate cleaning conditions, so that mortar compositions are obtained overall which are characterized by improved robustness against external influences.

The invention claimed is:

1. A method, comprising:
    mixing a non-polar reaction resin mixture based on radically polymerizable compounds into a mortar composition,
    wherein the non-polar reaction resin mixture contains:
        a reaction resin,
        one or more reactive diluents, and
        said non-polar reaction resin mixture
        has a polarity of <7 mN/m.

2. The method according to claim 1, wherein the mortar composition based on radically polymerizable compounds is a multi-component reaction resin system.

3. The method according to claim 1, wherein the reaction resin comprises at least one compound selected from the group consisting of a compound based on urethane (meth)acrylate, a compound based on epoxy (meth)acrylate, a compound based on a (meth)acrylate of an alkoxylated bisphenol, and a compound based on ethylenically unsaturated compounds.

4. The method according to claim 1, wherein the one or more reactive diluents has little or no dipole moment.

5. The method according to claim 1, wherein the one or more reactive diluents is selected from the group consisting of ethyl methacrylate (EMA), 3,3,5-trimethylcyclohexyl methacrylate (TMCHMA), isobornyl methacrylate (IBOMA), isobutyl methacrylate (i-BMA), tetrahydrofurfuryl methacrylate (THFMA), 2-ethylhexyl methacrylate (2-HEMA), cyclohexyl methacrylate (c-HMA), allyl methacrylate (AMA), benzyl methacrylate (BNMA), isodecyl methacrylate (IDMA), 1,12-dodecanediol dimethacrylate (1,12-DDDDMA), 1,6-hexanediol dimethacrylate (1,6-HDDMA), 1,4-butanediol dimethacrylate (1,4-BDDMA), 1,3-butanediol dimethacrylate (1,3-BDDMA), ethylene glycol dimethacrylate (EGDMA), and glycerol dimethacrylate.

6. The method according to claim 2, wherein the multi-component reaction resin system is a two-component reaction resin system.

* * * * *